July 13, 1926.
1,592,698
C. HUDSON
CAKE TURNER
Filed Oct. 31, 1925
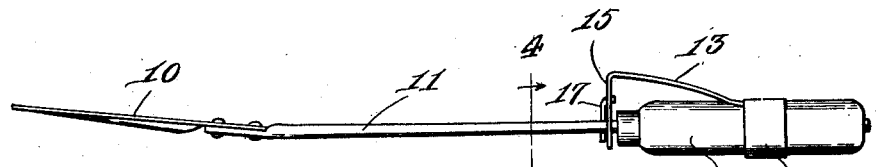
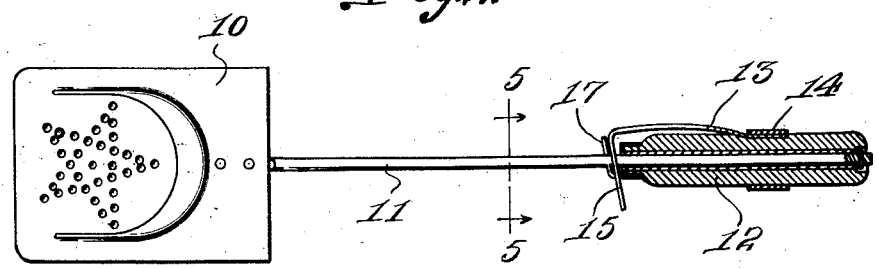
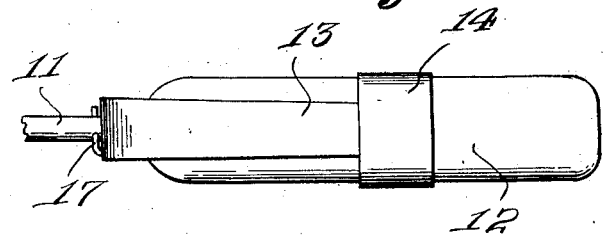
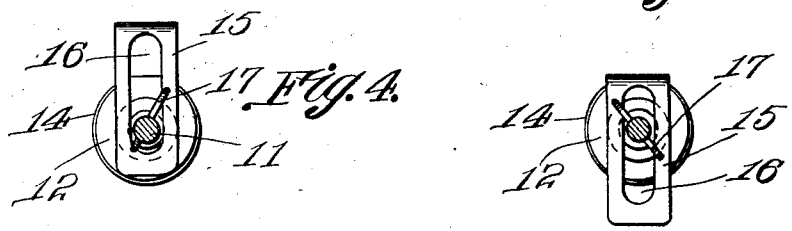
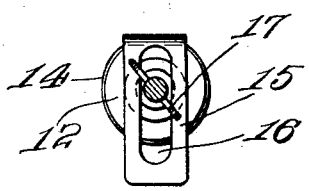
C. Hudson,
INVENTOR
BY Victor J. Evans
ATTORNEY
WITNESS:

Patented July 13, 1926.

1,592,698

UNITED STATES PATENT OFFICE.

CLYDE HUDSON, OF NAPOLEON, OHIO.

CAKE TURNER.

Application filed October 31, 1925. Serial No. 66,062.

This invention relates to cake turners and contemplates a structure by means of which the cake can be turned without turning the handle of the turner, the invention being very simple in construction, cheap to manufacture and residing in the combination and arrangement of parts as claimed.

In the drawing forming part of this application, like numerals of reference indicate similar parts in the several views, and wherein:

Figure 1 is an edge elevation of the cake turner constructed in accordance with the present invention, and showing the normal position of the parts.

Fig. 2 is a top plan view showing how the blade of the turner is operated to turn the cake without rotating the handle of the turner.

Figure 3 is a fragmentary plan view of the device.

Figure 4 is a sectional view on line 4—4 of Figure 1.

Figure 5 is a sectional view on line 5—5 of Figure 2.

The device forming the subject matter of the present invention includes a blade 10 which may vary in size and configuration without departing from the spirit of the invention, the blade being attached to one end of a shank 11, the other end of which passing through a handle 12 and capable of rotation therein. As above stated, the device is in the nature of a cake turner, and the handle and shank are provided with cooperating means whereby the blade can be turned without turning the handle 12.

This means consists of a leaf spring 13 having one end secured to the handle 12 in any suitable manner, preferably by means of a band 14, as shown in Figures 1 and 2. The leaf spring is normally spaced from the handle for the major portion of its length, and has one end bent at a right angle as at 15, this extremity of the spring lying in advance of the handle 12 and provided with a slot 16 through which the shank 11 passes. This slot allows the spring to be moved over the shank for the purpose of turning the latter and the blade 10. The shank 11 is provided with a cross pin 17, one end of which is secured to the extremity 15 of the spring, so that when the spring is depressed by the thumb of the user, the pin is actuated to turn the shank 11 and the blade. The normal position of the spring and blade 10 is shown in Figure 1, and when it is desired to turn a cake it is only necessary to depress the spring 13, as shown in Figure 2, whereupon the pin 17 is moved from the position shown in Figure 1 to the position shown in Figures 2 and 5, thereby turning the shank 11 for the purpose specified.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:—

A cake turner including a shank, a blade carried by one end thereof, a handle receiving the other end of the shank for rotation, a band surrounding the handle at a point between its ends, a leaf spring having one end clamped to the handle beneath said band, and having the major portion of its length spaced from the handle, the forward end of said spring being bent at a right angle to the handle and disposed in advance of the latter, and provided with a vertical slot to receive said shank, a pin passed through the shank in front of the right-angularly disposed portion of the spring, and normally arranged diagonally with relation to said slot, one end of said pin being offset and connected to the spring, whereby said blade and shank are rotated as a unit incident to the depression of the spring.

In testimony whereof I affix my signature.

CLYDE HUDSON.